United States Patent [19]
Erb et al.

[11] 3,932,245
[45] Jan. 13, 1976

[54] MECHANICAL EMBOSSING OF FOAMED SHEET MATERIAL

[75] Inventors: Edward R. Erb, East Greenville; Richard L. Maass, Emmaus, both of Pa.

[73] Assignee: GAF Corporation, New York, N.Y.

[22] Filed: Mar. 21, 1973

[21] Appl. No.: 343,399

Related U.S. Application Data

[60] Division of Ser. No. 78,878, Oct. 7, 1970, Pat. No. 3,741,851, which is a continuation-in-part of Ser. No. 821,409, May 2, 1969, Pat. No. 3,655,312.

[52] U.S. Cl. .................. 156/79; 101/23; 101/248; 156/209; 156/220; 264/321; 428/159; 428/161
[51] Int. Cl.² ..................... B32B 5/20; B32B 31/20
[58] Field of Search ............ 156/209, 219, 220, 77, 156/78, 79, 553, 555; 117/10; 161/116, 159, 161/160, DIG. 3; 101/248, 23; 264/175, 264/34, 40, DIG. 60, 54, 47; 428/158, 159; 425/4, 115, 367, 385, 372, 817

[56] References Cited
UNITED STATES PATENTS

| | | | |
|---|---|---|---|
| 1,910,894 | 5/1933 | George et al. ............... | 101/23 |
| 2,514,318 | 7/1950 | Elmendorf .................... | 161/117 |
| 2,639,660 | 5/1953 | Sunderhauf et al. ......... | 101/23 |
| 2,752,279 | 6/1956 | Alderfer ....................... | 156/78 |
| 3,024,154 | 3/1962 | Singleton et al. ............ | 156/209 |
| 3,196,030 | 7/1965 | Petry ............................ | 117/10 |
| 3,328,503 | 6/1967 | Ancker ......................... | 264/175 |
| 3,399,101 | 8/1968 | Magid .......................... | 156/209 |
| 3,408,248 | 10/1968 | Maass .......................... | 161/5 |

*Primary Examiner*—George F. Lesmes
*Assistant Examiner*—Stanley S. Silverman
*Attorney, Agent, or Firm*—Walter C. Kehm; Joshua J. Ward

[57] ABSTRACT

Decorative sheet materials such as foamed vinyl floor coverings comprising, preferably, a base or substrate such as asbestos felt, a layer of foam or cellular resin material on the base having portions of different thickness providing a relief pattern, the foam of the lands having relatively large cells and the foam of the valleys being crushed and having smaller cells with cell walls bonded to each other, a layer of non-cellular transparent resin material overlying both the land and valley areas of the relief pattern, and a printed color pattern or design being provided between the foam resin layer and the transparent resin layer, with colored areas of the pattern or design in accurate registration with and/or predetermined relation to the crushed or valley areas of the foam layer. In addition to the relief and color patterns, the product may also have a third pattern effect in registration with the relief and color patterns, i.e., a pattern of different light reflective characteristics at the exposed surface of the transparent layer. Apparatus and method for producing the covering materials according to the invention are also disclosed.

11 Claims, 9 Drawing Figures

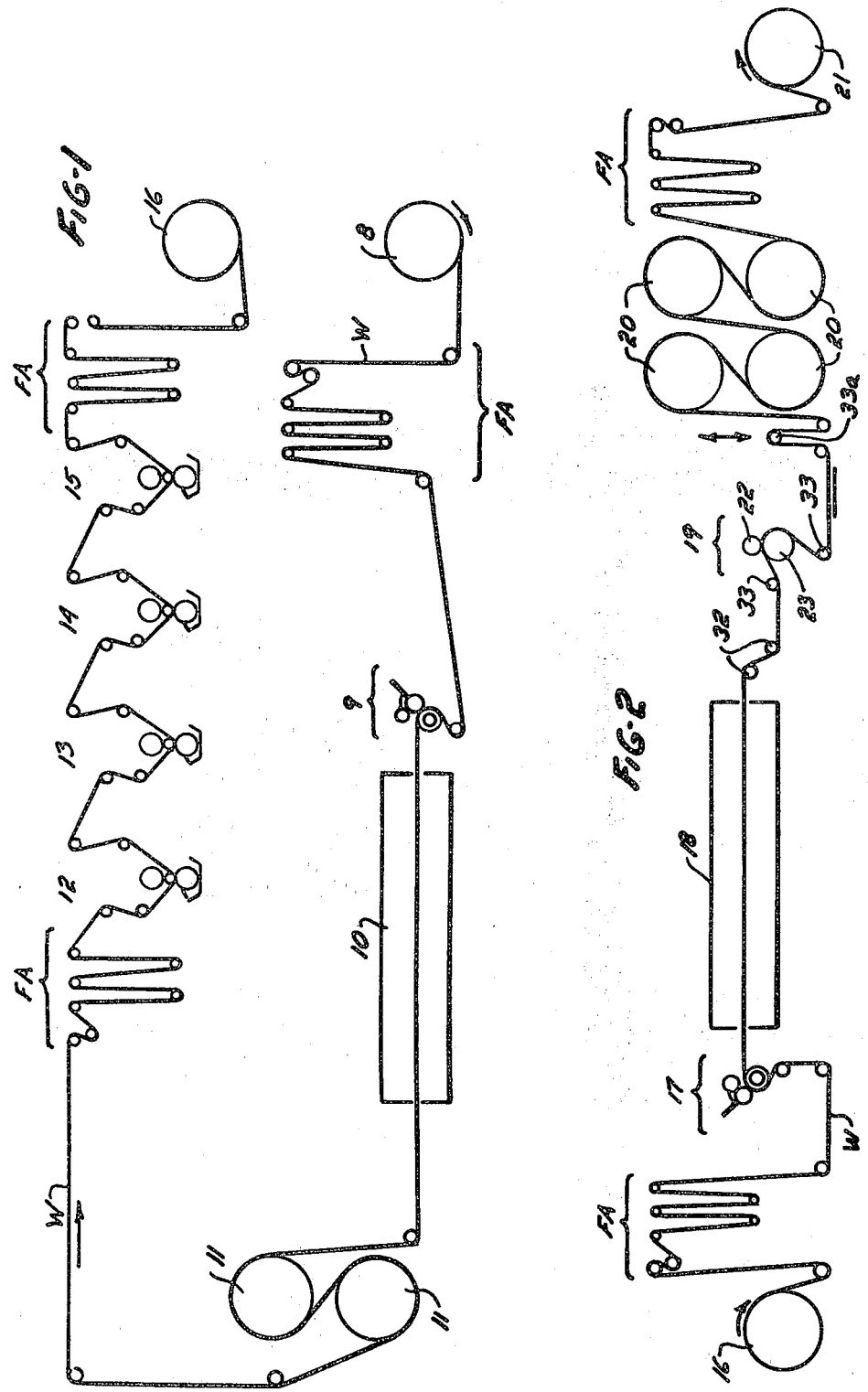

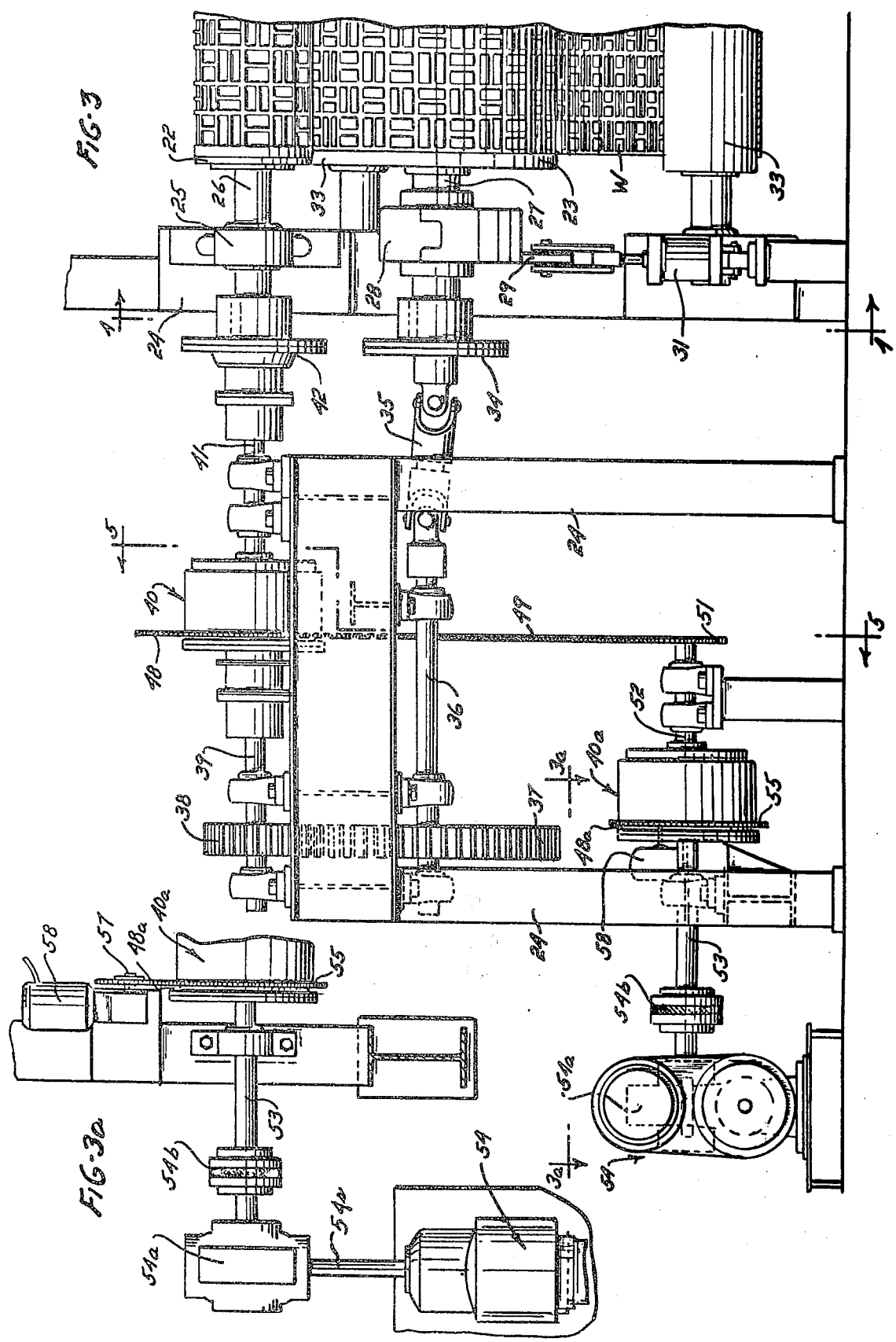

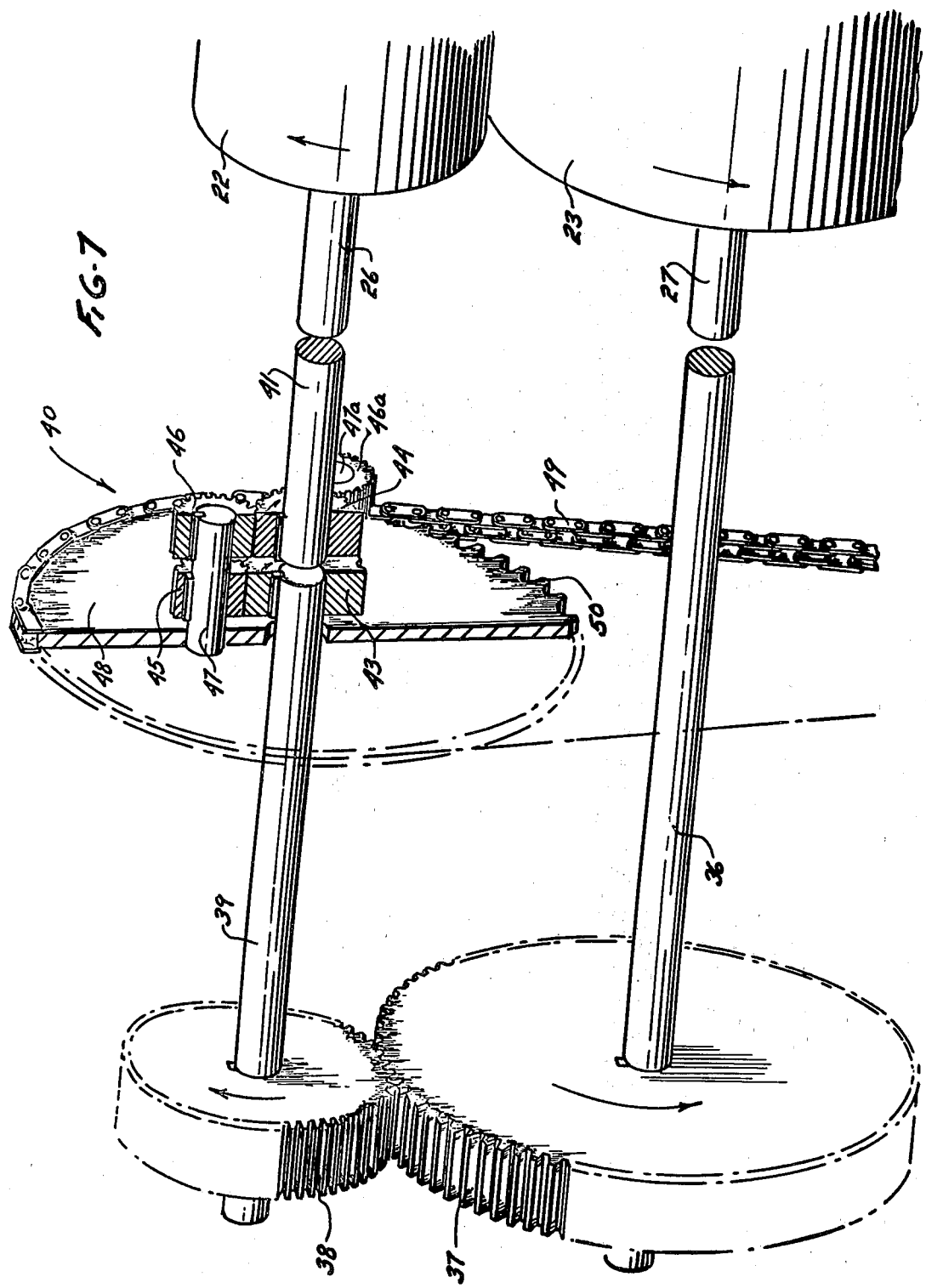

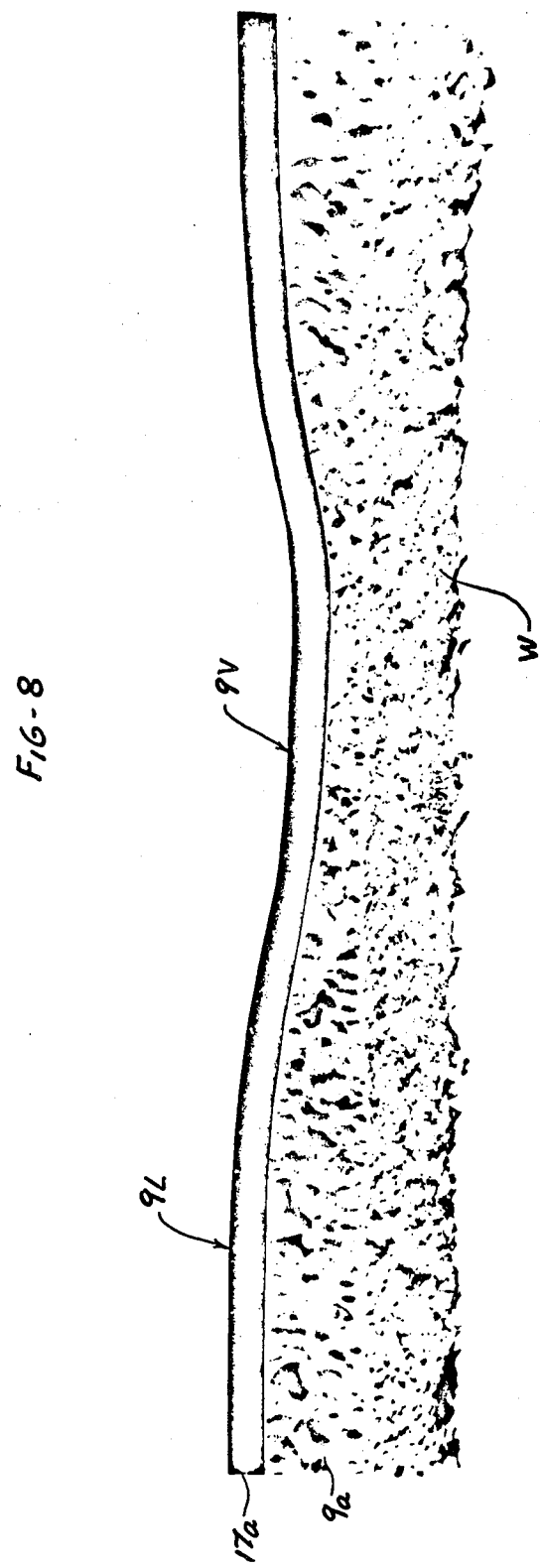

MECHANICAL EMBOSSING OF FOAMED SHEET MATERIAL

This is a division of application Ser. No. 78,878, filed Oct. 7, 1970, now U.S. Pat. No. 3,741,851, which is in turn a continuation-in-part of application Ser. No. 821,409 filed May 2, 1969 and now U.S. Pat. No. 3,655,312.

This invention relates to decorative sheet materials and is particularly concerned with surface covering materials, such as floor coverings, incorporating a foamed resin layer, a printed decoration and further having an embossed pattern effect in registration with and/or predetermined relation to the printed pattern. In a typical product of this general kind, the foamed layer is applied to a base or substrate, usually a felt base and in addition a transparent wear layer is applied at the top of the product.

Certain techniques are already known for producing a product of the general kind here described having printed and embossed patterns in registration with each other. According to one such prior operation (see for example Maass U.S. Pat. No. 3,408,248 issued Oct. 29, 1968 and assigned to the assignee of the present application) the foamable material is initially applied and gelled in areas of different thickness and printing is then applied in a manner providing pattern registration with the lands and valleys of the foamable layer. This product is ultimately heated to expand or develop the foam.

According to another such prior operation (see for example Rugg U.S. Pat. No. 3,458,337 issued July 29, 1969 and assigned to the assignee of the present application) the foamable layer applied to the base is formulated to contain both a blowing agent and a catalyst for lowering the decomposition temperature of the blowing agent and in the color printing operation an agent is applied in selected pattern areas adapted to deactivate the catalyst. Upon subsequent heating to develop the foam, the foaming agent is selectively decomposed only in the imprinted areas, thereby producing a relief pattern effect in registration with the printed pattern.

Various mechanical embossing techniques are also known, but heretofore it has not been fully satisfactory or practical to produce a relief pattern effect in registration with a printed pattern on a foamed type of surface covering material by the use of embossing rolls. Because the foamed layer has some appreciable thickness and is also a yielding or compressible type of material, it has been very difficult to maintain accurate registration between the embossing roll and the printed pattern. In addition, because the embossment of a foamed layer results in collapse of the air or gas cells within the foam structure, difficulties have been encountered in embossing foamed material as a result of the forcible displacement of the gas from the foam cells, which has sometimes tended to create blisters within the product. This has been particularly troublesome where the product, as is customary, also has an impervious top wear layer applied over the print decorated foamed layer. In such cases the mechanical embossing has tended to develop blistered or wrinkled areas in the top wear layer as a result of the displacement of the gas from the collapsing cells in the areas compressed by the embossing.

The invention has as its major objective the provision of decorative sheet materials, especially decorative floor coverings having improved characteristics and properties. More particularly it is an object of the invention to provide a novel form of foam or cellular floor covering having not only a color pattern, but also a relief or embossed pattern in registry with and/or predetermined relation to the color pattern and having distinctive properties, characteristics and advantages including certain advantages not heretofore attainable with any known products of this general type.

For example, the present invention provides for production of foam products with deeper embossing than is obtainable with prior techniques for producing a relief effect in registration with a printed pattern carried on a foamed layer. This is of especial importance in connection with the production of products in which the foam is of relatively high density and/or in which the foam layer is of relatively great thickness. Heretofore it has been difficult with the so-called chemical embossing techniques to produce products having deep embossing where the foam layer is either relatively thick or is of relatively high density, or where the top transparent wear layer is relatively thick.

As a further example, while certain prior products have had relief and color patterns in registration with each other, products of the present invention may have three visual pattern effects in registration with each other, namely a relief pattern, a color pattern and a pattern of different light reflective characteristics at the exposed surface of the product.

As a still further example, products of the present invention may be provided having valley areas of different height or thickness from other valley areas by use of a suitable embossing roll. Yet another example resides in the provision of products in which some or all of the land areas are color printed and some or all of the valley areas are unprinted. It will thus be understood that references herein to a relief or embossed pattern being in registry with a color pattern are inclusive of products in which valley areas coincide with or are coextensive with color patterns and products in which valley areas are devoid of color patterns, i.e. the relief or embossed pattern is always in predetermined location or position relative to the color pattern and may overlap therewith.

Various other distinctive characteristics and advantages of the products of the present invention will appear more fully as this description proceeds.

In achieving the objectives of the present invention, it is preferred to employ mechanical embossing according to the method and apparatus disclosed in our copending application above identified, including the unique embossing roll drive system shown in the prior application for ensuring accurate registration (i.e. predetermined relation) of the embossed pattern with a previously applied color pattern, notwithstanding the presence of the foam layer in the product. Moreover, the method and apparatus of said prior application also eliminate the problem of wrinkling or blistering heretofore encountered in efforts to mechanically emboss foamed products. It will be understood that other means may be employed for mechanical embossment in registry with a previously applied color pattern in producing the products of this invention.

How the foregoing objects and advantages are attained will appear more fully from the following description referring to the accompanying drawings, in which:

FIG. 1 is a diagrammatic illustration of an apparatus for continuously advancing a web of a base or substrate through a series of treatments including application of a foamable coat, gelling the foamable coat, and printing;

FIG. 2 is a diagrammatic illustration of an apparatus for continuously advancing a coated and printed web produced in accordance with FIG. 1 through additional treatment steps including application of a clear top coat, heating to develop the foam and fuse the resin materials, and emboss the foamed layer in registration with the printing;

FIG. 3 is a view of portions of embossing and backing rolls employed in the embossing operation diagrammatically illustrated in FIG. 2, together with one example of mechanism for interconnecting the embossing and backing rolls and for regulating the peripheral surface speed of the embossing roll;

FIG. 3a is a fragmentary plan view of certain of the parts shown in FIG. 3, taken as indicated by the section line 3a—3a on FIG. 3;

FIG. 7 is a diagrammatic view illustrating certain gearing and drive parts employed in the embodiment of the equipment shown in the other figures; and FIG. 8 is a photomicrograph of a section of a typical product according to the present invention, this view being magnified approximately 18 times.

Figure 4:
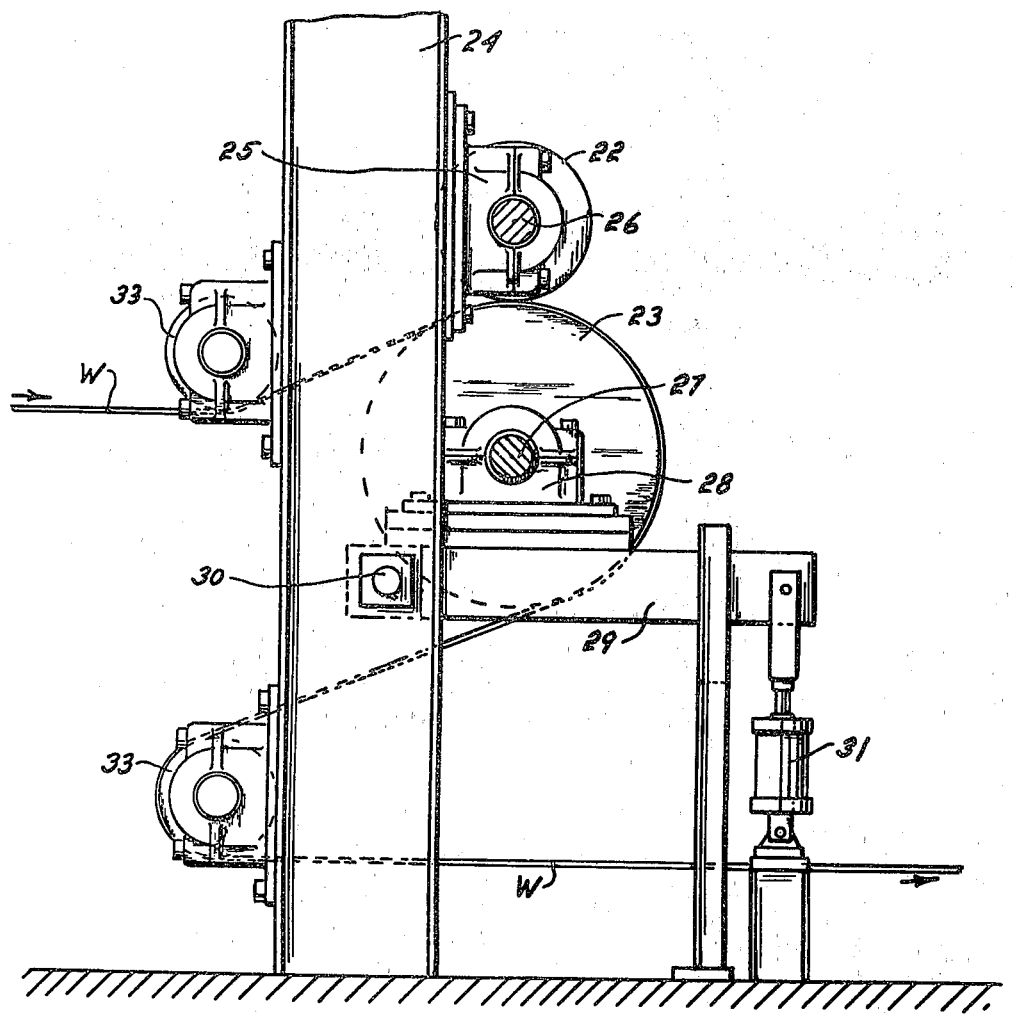
FIG. 4 is a view of various parts taken as indicated by the line 4—4 on FIG. 3.
Figure 5:
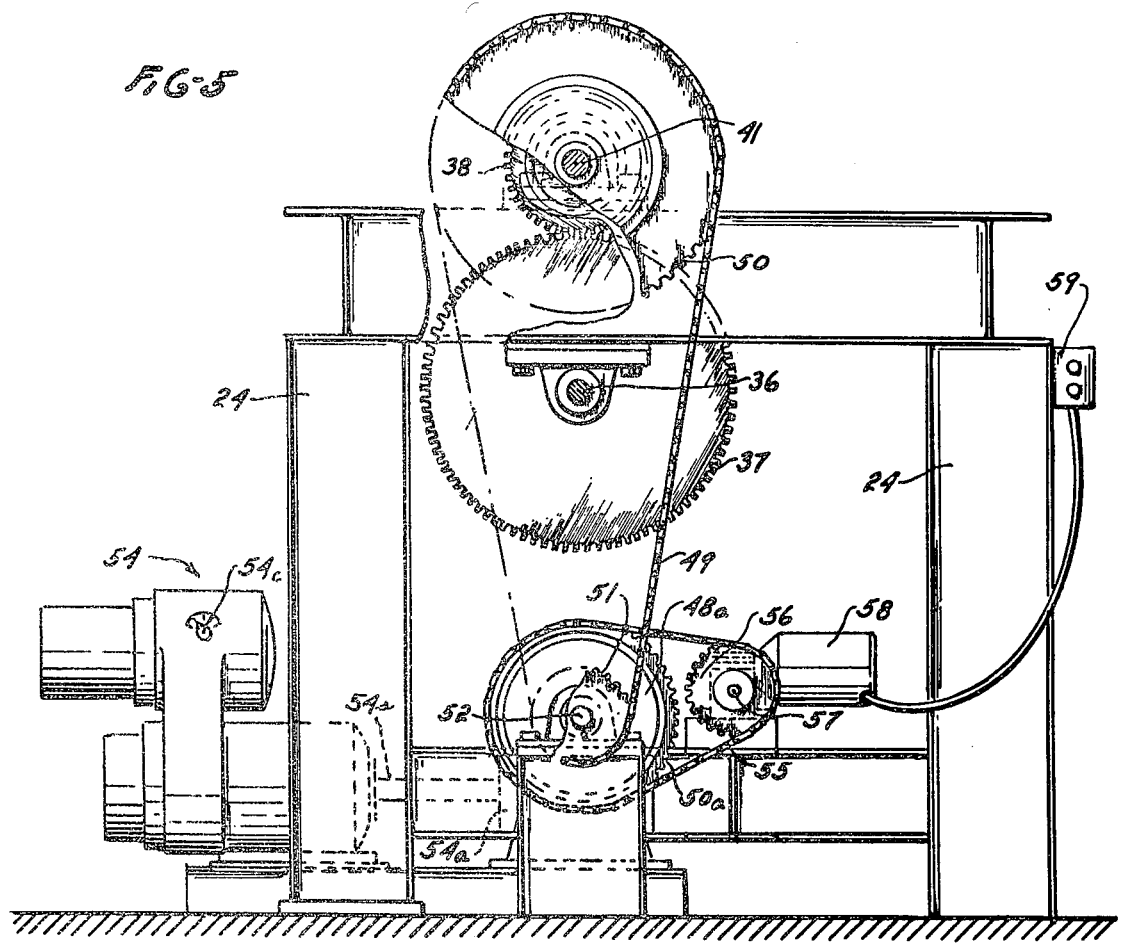
FIG. 5 is a view of various parts taken as indicated by the line 5—5 on FIG. 3.
Figure 6:
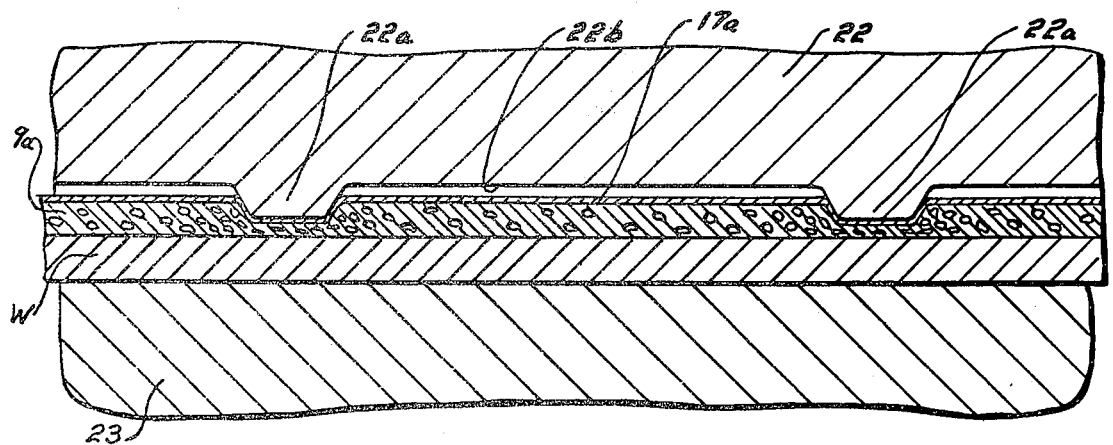
FIG. 6 is a greatly enlarged longitudinal sectional view through portions of the embossing and backing rolls forming the embossing nip and illustrating the embossing action upon the product being passed through the nip.

In considering the drawings, it is first pointed out that FIGS. 1–7 inclusive are derived from our copending application above identified. These figures, together with description thereof which follows illustrate and describe apparatus and method for producing a typical product according to the invention, as is illustrated in FIGS. 6 and 8.

Before considering the characteristics, properties and advantages of the present invention, reference is first made herebelow to FIGS. 1–7, and thereafter additional description will be given with particular reference to FIG. 8.

Turning now to the diagrammatic illustrations of FIGS. 1 and 2, for purposes of the present description, it is assumed that the product being made is a floor covering comprising a base in the form of a felt, such as asbestos felt, and that the floor covering is made up by applying coatings to the felt, including a foamable polyvinyl chloride resin layer, a printed decoration, and a transparent top or wear layer, also comprising polyvinyl chloride resin material.

In FIG. 1 the felt base employed is supplied in the form of a web from a roll 8. The web, indicated in these diagrammatic figures by the letter W is fed through a festoon accumulator FA and then to a reverse roll coater 9 which serves to apply a foamable resin layer, preferably comprising polyvinyl chloride resin material incorporating a dispersed blowing agent. The web then passes through oven 10 serving to gel the coating applied at 9. From the oven the web passes over the cooling rolls 11 and then into another festoon accumulator in advance of delivery of the web to the printing equipment. Four stages of printing 12, 13, 14 and 15 are shown and it is here assumed that in each printing stage a rotogravure printing operation is performed, the four stages being provided for multi-colored effects. After passing through another festoon accumulator the web may be wound up as indicated at 16.

This roll 16 of the web may then be placed in the supply position (toward the left) in FIG. 2 and the web is fed from the roll through a festoon accumulator and then to a reverse roll coater 17 employed to apply a clear polyvinyl chloride resin wear layer to the product over the printing. From the coater 17 the web passes through an oven 18 where it is heated sufficiently to decompose the blowing or foaming agent and thus develop the foam, and also fuse the resin materials of the foam layer and top or wear layer. Upon leaving the oven the web passes through a roll embosser 19 which is arranged adjacent to the delivery end of the oven 18 sufficiently close to the discharge end of the oven so that the product is still in a relatively hot condition and may therefore more readily be subjected to the embossing action.

After delivery from the embosser the web passes over cooling cans or rolls indicated at 20 and, after passing through a festoon accumulator, the finished product is rolled up as indicated at 21.

Although two separate runs are indicated in FIGS. 1 and 2, it should be understood that, if desired, all of the operations may be performed in a single pass of the web. Moreover, if desired, more than two passes may be utilized.

While it is preferred for floor coverings to employ a base such as asbestos felt, it is pointed out that for various decorative sheet materials other kinds of bases may be used, for instance a paper web. Indeed, for some purposes the product may be formed upon a temporary base such as release paper or a smooth metal or other surface which may then be stripped from the product before use. It should also be understood that certain products embodying some features of the invention may be made without a top or transparent wear layer, although such a layer is preferred for floor coverings and for providing a protective or other function in other uses.

Before turning to the equipment illustrated in FIGS. 3 to 7 inclusive, it is mentioned that it is contemplated according to the present invention that the rolls of the roll embosser 19 are rotated under the influence of the web being drawn through the nip between the embosser rolls, rather than being driven from a separate source of power as in various prior art embossers. For this purpose the cooling rolls 20 are desirably driven, thereby serving to advance the web through the embossing nip.

With the foregoing in mind, attention is now directed to FIGS. 3 to 7 which illustrate in greater detail the roll embosser and appurtenant equipment. The roll embosser basically comprises two rolls, one of which, indicated at 22, is a roll provided with lands and valleys according to the embossed or relief pattern desired. The other roll, indicated at 23, is a backing roll, preferably a smooth surfaced roll. The embossing nip is provided between these two rolls, and the embossing roll 22 engages the top side of the product, (on which the foamed layer, pattern printing, and top wear layer are applied) and the underside of the base or felt web is engaged by the surface of the backing roll 23.

As best seen in FIGS. 3 and 4, the embossing and backing rolls 22 and 23 are mounted by means of suitable frame or support elements 24. Bearing blocks 25 cooperating with the shaft 26 of the embossing roll rotatively mount the embossing roll in fixed position on the support elements 24. The shaft 27 of the backing roll 23 is mounted by means of bearing blocks 28 carried by a pair of arms 29 which are pivoted at 30 on the supports 24. The position of the free ends of the arms 29 and thus of the backing roll 23 is controlled by a pair of hydraulic piston and cylinder devices such as indicated at 31. These hydraulic devices control the pressure of engagement of the web in the nip between the embossing and backing rolls. Thus, the embossing is effected at constant roll pressure, there being no limiting stop establishing a constant nip or roll spacing.

From FIG. 2 it will be seen that as the web W advances from the oven 18 to the roll embosser, the web passes over and under a pair of guide rolls 32 and, after passing under idler roll 33, over the roll 23 and into the embossing nip. The web is retained in engagement with a large portion of the periphery of the backing roll 23 by means of the second idler roll 33, and after passage over the roll 33 the web is fed to the cooling rolls 20 which, as above noted, serve to draw the web through the embossing nip.

FIG. 2 also diagrammatically illustrates a known form of "dancer" roll assembly 33a which serves to establish or maintain uniformity of tension in the web W as it passes through various parts of the equipment. Because the back surface of the web is maintained in contact with the backing roll 23 throughout a substantial portion of the peripheral surface thereof, the backing roll is caused to rotate at a peripheral surface speed substantially identical with the speed of the web surface in contact therewith. In accordance with the preferred practice of the invention, this interengagement of the web and the backing roll constitutes the only driving means for the backing roll. Moreover, as will now be explained, it is further contemplated according to the invention that this driving force which is transferred from the web to the backing roll is the principal source of drive employed to rotate the embossing roll 22.

Power is transmitted from the backing roll 23 to the embossing roll 24 by power transmission mechanism which may take a variety of forms but which incorporates means for varying the peripheral surface speed of the embossing roll with respect to the peripheral surface speed of the backing roll. One form of equipment for accomplishing this purpose is illustrated in FIGS. 3, 5 and 7, as described just below.

The backing roll shaft 27 is connected through a coupling 34 and through a universally jointed shaft section 35 with the shaft 36 journaled on supporting elements 24 in a horizontal position. The universally jointed shaft section 35 accomodates the vertical adjustment movement of the backing roll 23 under the influence of upward and downward swinging of the arms 29 when the hydraulic cylinders 31 are actuated. Shaft 36 carries a spur gear 37 meshing with a spur gear 38 which in turn is mounted on the shaft 39 journaled on supporting framing. Shaft 39 is in turn associated with the planetary gear mechanisms generally indicated at 40 with which the shaft 41 is also associated, the latter being connected through coupling device 42 with the shaft 26 of the embossing roll.

The essential parts of the planetary gearing unit 40 are illustrated in a diagrammatic manner in FIG. 7. Here it will be seen that the shaft 39 carries a sun gear 43 and that the shaft 41 carries a sun gear 44, the two shafts 39 and 41 not being directly connected within the transmission unit 40 but being connected only through the gearing associated with the sun gears 43 and 44. Gear 43 meshes with gear 45 and gear 44 meshes with gear 46, the gears 45 and 46 both being keyed to shaft 47 which is journaled in the rotative structure illustrated in FIG. 7 as a disc 48. Since the structure 48 is rotative about the common axis of shafts 39 and 41, gears 45 and 46 are planet gears which are orbitally movable about the common axis of the sun gears 43 and 44. Preferably the transmission unit includes several sets of planet gears, three being typical, and it will be noted that toward the right of the disc 48, just below the shaft 41, another planet gear 46a appears, this being mounted upon the shaft 47a. The shaft 47a, like the shaft 47 would also carry a gear meshing with the sun gear 43 and the shaft 47a would be journaled in the rotative structure 48. A third such set of planet gears would be arranged in equi-spaced relation about the circumference of the sun gears 43 and 44, but these parts are broken out in FIG. 7 for the sake of simplifying and clarifying the illustration of the gearing arrangements.

The rotative structure 48 which carries the planetary gears may be either held stationary or may be turned in one direction or the other by means of the chain 49 cooperating with the sprocket teeth 50 formed at the periphery of the structure 48.

As will clearly be seen from inspection of FIG. 7, rotation of the backing roll 23 under the influence of motion of the web, as above described, will cause rotation of shaft 36 and gear 37 and this in turn will rotate gear 38 and shaft 39. If the rotative structure 48 is held stationary, the shafts 47 of the pairs of planet gears will not revolve around the common axis of the shafts 39 and 41, but the sun and planet gears 43, 45, 46 and 44 will transmit driving force from the shaft 39 to the shaft 41 which, in turn, will rotate shaft 26 and thus the embossing roll 22. Thus, if the rotative structure is held stationary, the relation of the peripheral surface speed of the embossing roll to the peripheral surface speed of the backing roll will depend upon the relative sizes of the gears 37 and 38 and also upon the relative sizes of the sun and planet gears of the transmission unit 40.

It is contemplated according to the present invention that the rotative structure 48 of the transmission unit 40 be controlled by some adjustable power means, and the equipment herein described and illustrated for this purpose includes another planetary gearing unit indicated generally in FIGS. 3 and 3a at 40a, this unit being of essentially the same basic construction as the unit 40, incorporating sun and planet gears such as those described above with reference to FIG. 7 and including also a mounting structure 48a for the planet gears. Since the unit 40a is essentially the same as unit 40, the description thereof will not be duplicated. However, the connection of this unit in the system is described, as follows.

Chain 49 which regulates the motion of the mounting structure 48 for the planet gears of the unit 40 is controlled by a sprocket 51 mounted on shaft 52 which is one of the shafts provided with a sun gear in the transmission unit 40a. Shaft 53, arranged coaxially of the shaft 52, carries the other sun gear of the transmission unit 40a. As seen in FIGS. 3, 3a and 5, shaft 53 is adapted to be driven through a variable speed power drive mechanism indicated generally at 54 and including a speed reducing unit 54a, driven by shaft 54s, the connection between the speed reducing unit and the shaft 53 including the coupling 54b. Unit 54 is desirably provided with a speed control 54c adjustable to approximate the correction desired in the drive of the embossing roll 22 from the backing roll 23, as is explained more fully hereinafter.

The rotative planet gear mounting structure 48a of the unit 40a has sprocket teeth 50a with which the chain 55 cooperates, the chain 55 also meshing with sprocket 56 mounted on the shaft 57 which is driven by the fixed speed geared driving motor 58. The motor 58 is preferably a reversible power unit controlled, for example, by the push buttons of the manual control 59, so that the direction of rotation of the mounting structure 48a for the planet gears of the transmission unit 40a may be intermittently operated in either direction of rotation.

It should be understood that various drive and transmission units may be employed for the purposes of the present invention, the mechanism herein illustrated representing one preferred embodiment. The essential purposes and operational characteristics contemplated by the invention are described herebelow and may be achieved by the mechanism described and illustrated and also by other mechanisms or arrangements capable of achieving the same operational characteristics as described.

The herein referred to problem of embossment in registry with a previously printed pattern on a running length of foamed material has been heretofore a major obstacle confronting industry. Various factors may influence the registration problem, including creepage of the web, shrinkage or stretching of the product being made, the thickness and density of the foam being embossed, the overall thickness of the product and other factors. For example, printing is done under normal room conditions so that the felt backing may vary in moisture depending on the temperature or humidity at the time. As the felt emerges from the oven prior to embossing, however, it is hot and in a bone dry state and since the sheet dimensions are influenced by moisture content, it is usually different from what it was at the time of printing. Temperature differences alone cause changes from thermal expansion. Sheet dimensions, particularly in the direction of travel, are influenced by the tension on the web which is difficult to control since the hot foam cannot be pinched between rolls that would be necessary to regulate the tension prior to embossing. Tension between cylinders in the printing operation also results in differences between the length of a rotogravure repeat compared to that on the base coat at a different tension condition. There are other reasons for the variation in color pattern position and dimension and the inconsistency of error. Consequently, it is relatively rare to find that the color pattern on the sheet entering the embossing roll is the same dimension and/or position as that on the embossing roll in the direction of sheet travel.

Some of the above factors may require increase in speed of the embossing roll in order to maintain registration, and other factors may work in the opposite sense. Thus, although controlling factors are ordinarily such as to require increase in the peripheral surface speed of the embossing roll, a reduction in peripheral surface speed is needed under some circumstances. The increase or decrease in peripheral surface speed here mentioned represent increase or decrease in relation to the peripheral surface speed of the backing roll.

In connection with the production of decorative surface covering material in accordance with the present invention, it is here pointed out that a printed pattern applied by the printing stages 12–15 inclusive as illustrated in FIG. 1 provides for the repetition of the printed pattern at predetermined intervals along the length of the web. It is further contemplated that the embossing roll 22 be provided with lands and valleys conforming with at least some portions of the printed pattern, and in a typical embodiment of the equipment, the embossing roll 22 has a circumference which is evenly divisible by the length of the predetermined printed pattern which is repeated at intervals along the web. In the preferred embodiment, the circumference of the embossing roll is equal to the distance between adjacent points of repetition of the printed pattern. This is preferably accomplished by use of an embossing roll 18 inches in circumference, which is representative of a commonly employed pattern repeat. Printing rolls used with such 18 inch pattern repeat are preferably 36 inches in circumference.

In an illustrative operation with printing and embossing rolls of 36 and 18 inch circumference respectively, and with the embossing roll rotated merely by virtue of engagement with the web, it is found that if the pattern on the embossing roll is in registration with the printed pattern on the web at a starting point, upon advancement of the web by 18 inches, the next starting point of the pattern on the embossing roll will not return to engagement with the web until about one-eighth inch, for example, beyond the point where the printed pattern commenced its repetition, due to skrinkage of the web. Because of this, in such illustrative operation, in order to maintain registration of the embossing roll with the printed pattern, it is necessary to provide for rotation of the embossing roll at a peripheral surface speed higher than that of the backing roll, notwithstanding the fact that the pattern repeat on the printing and embossing rolls are both of equal dimension circumferentially.

In this illustrative operation here under consideration it will therefore be seen that it is necessary, in order to maintain registration of the embossing roll with the printed pattern, to increase the speed of rotation of the embossing roll, by automatic or manual control means above that which would be established as a result of rotation of the embossing roll merely by virtue of engagement of the web with the backing roll driving the embossing roll. This prevents a cumulative drift error resulting from small repetitive errors.

It is contemplated according to the present invention that the correction required by way of increase or decrease in speed of the embossing roll be effected by the drive unit 54 for rotating the input shaft 53 of the transmission unit 40a, thereby providing for a continuous approximate corrected speed of rotation of the support 48 (through connecting parts 52, 51 and 49) for the planet gears 45 and 46 of the transmission unit 40 which of course will also result in correction of the speed of the embossing roll 22.

The speed of rotation of the output shaft 52 of the unit 40a is also controllable under the influence of the intermittent operation of the reversible drive unit 58 by actuation of manual control 59. Thus, shaft 57 of this drive unit carries sprocket 56, and chain 55 is connected with sprocket 50a rotating with support 48a for the planet gears of the unit 40a. It is contemplated according to the invention that this intermittent control 59 be employed as an adjustment means by which the operator may compensate for minor deviations from registration. Control 59 can also be used to correct irregularities, for example, as a result of a splice in the web. Although this monitoring or intermittent adjustment can be effected under the control of electro-optical means observing or sensing the printed pattern or one or more index marks on the front or back of the web or selvage thereof in predetermined relation to the repeated printed pattern as it passes a given point, it can also be controlled merely by an operator adjusting the control 59 in accordance with his visual observation of the registration as the web leaves the embossing rolls.

In considering another aspect of the process and equipment employed in the present invention, it is again pointed out that in certain prior attempts to utilize embossing rolls for embossing a resinous foam, difficulty has been encountered because of tendency to produce wrinkles or blisters in the material being embossed. This has been especially true in attempts to utilize embossing rolls upon a resinous foam surface covering material having a sustantially impervious, usually transparent, resin wear layer overlying the foam. The origin of this problem apparently lies in the fact that the embossing action crushes the foam and results in collapse or deflation of foam cells in the areas underlying the lands of the embossing roll. The gas or air from these collapsed or deflated cells is forced or driven laterally under the surface layer of the product into areas in registry with the valleys of the embossing roll. This action has created problems with wrinkling and blistering, thereby damaging the decorative effects sought to be secured.

According to the present invention the foregoing difficulty has been overcome by employment of an embossing roll of the type somewhat diagrammatically illustrated on an enlarged scale in FIG. 6. Here the backing roll is indicated at 23 and the embossing roll at 22. The product being embossed is here shown as including a felt web W on which a foamed resin layer 9a covers or is laminated to the web and having a printed decoration (now shown) and also an overlying transparent resin wear layer 17a.

The lands of the embossing roll such as indicated at 22a in FIG. 6 serve to produce the valleys in the embossed pattern being imparted to the product and in doing so these lands crush the underlying foam and collapse the foam cells, as is indicated more or less diagrammatically in FIG. 6, resulting in deflation of the cells and lateral dissipation of the gas from the collapsed cells into the areas underlying the valleys 22b of the embossing roll.

Examination of FIG. 6 will show that these valleys 22b of the embossing roll are not in contact with the surface of the product being embossed and it is contemplated according to the present invention that valleys be provided in the embossing roll adjacent to the lands thereof, which valleys are of sufficient depth to avoid contact with the product. In considering the importance of this it is to be noted that if the valleys of the embossing rolls snugly engaged the product or exerted some pressure upon the product, this would restrict the lateral dissipation of the gases from the collapsed foam cells underlying the lands of the embossing roll and in consequence would tend to produce blisters or wrinkles. According to the present invention it has further been found that this tendency toward blistering or wrinkling can be overcome by providing valleys in the embossing roll of depth sufficient to avoid restriction of the lateral dissipation of the gases in the foam layer lying beneath the impervious top wear layer of the product. This also eliminates any compression of the foam in the land areas with a consequent decrease in the foam thickness.

With the arrangement above described a substantial area of the product, even up to about 25%, may be embossed to form valleys, without encountering blistering or other difficulties.

The depth of embossing in products according to the invention is such as to provide valleys having a thickness between about 25% and 75% of the thickness of the fully foamed lands. Preferably the valleys are less than 50% of the thickness of the lands. Further, suitable variations in the heights of the different land areas on the embossing roll enable production of products having corresponding reverse variations in the thickness of the different valley areas within the above ranges.

Before considering various of the characteristics and advantages of the products reference is made to a typical production operation which is only illustrative and not to be regarded as limitative. All parts, quantities and proportions referred to herein and in the appended claims are by weight unless otherwise indicated.

In an illustrative operation according to the present invention, the foamable composition applied to the web, for instance by the reverse roll coater indicated at 9 in FIG. 1, may be formulated as follows:

For each 100 parts of resin (homopolymer dispersion PVC (polyvinyl chloride) resin of 2.05 relative viscosity):

| | Parts |
|---|---|
| Butylbenzyl phthalate (plasticizer) | 56.00 |
| Mineral spirits | 4.25 |
| Epoxidized soya oil | 6.4 |
| Titanium dioxide | 7.4 |
| Azodicarbonamide (blowing agent) | 2.5 |
| Zinc octoate (8% zinc) (stabilizer, blowing agent catalyst) | 2.225 |

This foamable coating is then gelled, but without decomposing the foaming agent, by passage through the oven 10 shown in FIG. 1, and after cooling of the web the printed pattern is applied as indicated at 12, 13, 14 and 15.

The clear top coating applied by the reverse roll coater 17 in FIG. 2 may be formulated as follows:

For each 100 parts of a high molecular weight homopolymer dispersion PVC resin of 2.65 relative viscosity:

| | Parts |
|---|---|
| Dioctyl phthalate | 35.0 |
| Epoxidized soya oil | 7.0 |
| Polyethylene glycol monolaurate | 0.8 |
| Light stabilizer | 5.0 |
| High boiling mineral spirits | 18.0 |

The oven 18 shown in FIG. 2 then serves to fuse the resin materials and decompose the blowing agent uniformly throughout the area of the product. Thereafter the web is passed while still hot, for instance while at a temperature of from about 225°F., to about 325°F., through the embossing nip as fully described above.

Backing roll 23 is preferably cooled by water circulation to a temperature below about 200°F., and the embossing roll 22 may also be cooled. Cooling of the backing roll will assist in "freezing" the embossed design.

It will be understood that the invention is useful in connection with products made with a variety of resin materials capable of yielding a flexible, resilient foam, although for purposes of floor coverings the polyvinyl chloride resin materials are preferred, especially plastisols or dispersion grades of such polyvinyl chloride resin materials. In general, the resins used are preferably thermoplastic resin materials, including elastomers, the thermoplastic characteristic being desirable because when the foam of such resins is embossed or crushed, the crushed cell walls will adhere to each other and will thus retain the desired embossed configuration, when the embossing is applied at elevated temperatures, as is contemplated.

In addition to the polyvinyl chloride resin materials, copolymers of polyvinyl chloride with polyvinyl acetate or polyvinylidene chloride may be used, and still other resins may be used, for instance various of the polyolefins, such as polyethylene or polypropylene. Polystyrene resins are also usable, and elastomers such as various synthetic and even natural rubbers, particularly those having thermoplastic characteristics.

The foam layer may or may not incorporate a pigment or other coloring material, and various different plasticizer and stabilizer systems may be used, as will be understood.

Although it is preferred to develop the foam layer by the use of a blowing or foaming agent such as azodicarbonamide, the foaming may be accomplished with other such agents and/or in other ways, even by mechanical frothing of the resin material prior to fusing or curing of the resin.

It is of advantage in the technique of the present invention that the foam is embossed by mechanical means, rather than by a chemical system of embossing. Because the chemical systems rely upon reaction of an inhibitor with the blowing agent or of some agent with, and serving to suppress the action of, a catalyst for the blowing agent, or some other chemical reaction, only certain blowing agents or systems can be utilized. In contrast, in the mechanical embossing technique of the present invention, greater latitude is afforded in the selection of the blowing agent and blowing system, because the mechanical embossing is effective to produce the desired relief pattern in the foam layer, regardless of the specific way in which the foam was developed.

The employment of the mechanical embossing technique of the present invention also has other advantages in producing the desired embossed products, as compared with chemical embossing. For example, when producing a product having a relatively thick foam layer by the chemical embossing techniques, it is frequently necessary to store the product after printing with the chemical embossing ink in order to provide time for the penetration of the ink into the foamable layer. In contrast, with the present process there is no necessity for any interval of storage following the printing of the color pattern.

In addition, with chemical embossing, if any error has been made in the printing of the embossing ink, this will not show up until after the product has been fed through the oven for effecting blowing and for fusing the resin materials, and this sometimes results in considerable waste of material. In contrast, with the mechanical embossing technique of the present invention, an error in the embossing, such as an error in registration, will be immediately apparent and may be corrected without appreciable waste of product.

Another advantage of the mechanical embossing technique of the present invention as compared with chemical embossing is that with the use of rotogravure printing rolls in chemical embossing, the doctor blade associated with each roll ordinarily leaves a thin film or veil of the inhibitor-containing embossing ink on the lands of the roll, and the transfer of this thin film of ink to the product diminishes the blowing or foaming action and the foam height in areas where it was not intended. In contrast, in the present process, the printing inks do not contain any inhibitor or other agent acting to diminish the blowing, in view of which it is of no consequence if a thin film or veil of the ink remaining on the lands of the roll is transferred to the product, and relatively increased foaming and foam heights are attained.

With the mechanical embossing process of this invention it is also easier to register an embossing (compressing) effect in a clear or uncolored or unprinted area of the product, as compared with chemical embossing techniques.

The mechanical embossing technique of this invention has still another favorable contrast with chemical embossing. Thus, when printing the decorative color pattern upon the foamable layer of the product, it is sometimes desirable to preliminarily apply a uniform smooth resin coating upon the foamable layer to serve as a smooth base on which to print the color pattern, this being especially desirable where the color pattern to be printed has features which are intricate and fine-lined. When this is done with chemical embossing techniques (in which the embossing ingredient is also incorporated in the ink), it is necessary for the embossing ingredient or agent to penetrate the resin layer intervening between the foamable layer and the printing and this sometimes results in ineffective penetration and therefore impairment of the desired chemical embossing effect. This problem is completely eliminated by the employment of the mechanical embossing process of this invention.

Products produced by the method and apparatus fully described above have many distinctive and desirable characteristics and properties.

In the first place, when formed, as is preferred, of polyvinyl chloride resin materials, the product has desirable cushioning and heat insulating characteristics and also has excellent wear resistance. Moreover, notwithstanding that the products are of the foam type, the products are characterized by highly accurate registration between color pattern and mechanical embossing pattern.

A cross section of a typical product according to the invention is illustrated in the photomicrograph of FIG. 8. The typical product here shown is formed on an asbestos felt base W about 0.035 inch in thickness. The foam layer 9a overlies the top surface of the felt base and the transparent wear layer 17a overlies the foam layer. The foam layer has land areas, such as that underlying the arrow 9L, having a thickness for example of about 0.035 inch. In the photomicrograph a valley area appears under the arrow 9V and it will be seen that in the valley area the resin foam has been crushed and deflated, thus being appreciably thinner than the foam in the land areas, for instance about 0.020 inch in thickness.

The clear resin top or wear layer 17a is non-cellular and is of uniform thickness through both the land and valley areas of the product. Although, in the photomicrograph, this layer appears dark, it will be understood that it is actually clear or sufficiently transparent to disclose the underlying printed pattern.

Although the foam in the valley areas is crushed and the cells collapsed or deflated, so that the physical structure in the foam layer is different from the physical structure of the foam in the lands areas, the entire foam layer is nevertheless chemically homogeneous and therefore of uniform chemical properties in relation to both the underlying felt base and the overlying wear layer.

Various of the physical or structural differences in the valleys of the foam layer as compared with the land areas can be understood from analysis of the mechanical embossing technique used in making the product, and various of these differences may also be seen in the photomicrograph of FIG. 8. The mechanical embossing or crushing of the foam in the valley areas is ordinarily sufficient to cause some of the cell walls in the valley areas to collapse and become fused or adherent to each other, and since the foam structure preferably comprises thermoplastic resin material and is relatively hot at the time of embossing, this condition will remain in the product, so that in the valley areas it may be said that the foam structure is permanently partially collapsed, flattened or deformed. In the valley areas the cell structure appears somewhat like a honeycomb structure, as compared with the much more widely open cells which are present in the land areas. It will also be understood that in the valley areas the foam structure has a higher density than in the land areas.

Because of the fact that the embossing is effected by pressure contact of the lands of the embossing roll with the valley areas of the product, thereby crushing the cell structure of the valley areas, while the land areas of the product remain free from contact with the embossing roll, the product of the present invention may, if desired, have a third visual pattern effect in registration with the embossed pattern and the color pattern, thereby providing a unique combination of registered pattern effects not present in any other foamed surface covering product. This may be explained as follows:

Since the surface of the valley areas is in contact with lands of an embossing roll in the last stage of the production, while the lands of the product remain out of contact with the embossing roll, it is possible to develop a different surface characteristic at the exposed side of the transparent wear layer in the valley areas, as compared with the land areas.

For example, the light reflective characteristics of the land areas and the valley areas may be different. As one example of such varying surface characteristics which the product may display, reference is made to the use of an embossing roll having land areas which are textured, and to appropriate regulation of operating conditions including embossing roll temperature, which make it possible to impart a corresponding textured surface characteristic to the valley areas of the product having lower light reflection than the surfaces of the land areas. This may be used to provide a closer representation of the normal contrast between mortar joints and tile in a product simulating a tile floor. Similarly, it may be used to advantage in products simulating brick flooring and other types of flooring in which mortar joints between stone chips, tile or bricks are simulated.

Graining or texturing the land surfaces of the embossing roll may also produce some other differences in the reflective or refractive characteristics of the valley areas as compared with the land areas. While these surface characteristics may not ordinarily constitute a dominant influence in the overall visual effect of the product, nevertheless in certain types of patterns, these surface effects in registry with the embossing and color patterns can add unique and pleasing characteristics to the overall appearance of the product. Effects of this type may be accentuated by employing an embossing backup roll having a rubber or other yielding surface, instead of a steel surface.

Products according to the present invention may be made in a wide variety of designs, both with respect to the printing pattern and also with respect to the embossing pattern, and throughout such pattern variations accurate registration may be maintained between color pattern areas and areas in which the foam layer of the product is crushed.

It is also possible with variations in embossing rolls employed to provide products of a wide range of characteristics with respect to delineation of the embossment. Greater flexibility in this respect is possible with products of the present invention, as compared with products produced by certain prior techniques, for example the so-called chemical embossing techniques, which latter under most circumstances tend to produce sharply delineated embossments.

With certain types of patterns including intricate and narrow valley areas, a product according to the present invention having valley areas with rounded rather than sharp edges is of advantage with respect to floor cleaning operations and floor waxing operations, because cleaning is more readily effected and there is less tendency for wax to accumulate in the valleys. Well rounded, rather than sharp valley areas are clearly indicated in the photomicrograph of FIG. 8.

Somewhat rounded rather than sharp edged valleys also tend to minimize abrasive wear, tearing or other deformation of the product, as by shoe heels, particularly with certain types of embossing patterns where the valley areas are relatively broad.

The product of the present invention is also of advantage in certain types of products because the products may be characterized by deeper embossing and/or thicker foam than is practicable to develop with certain prior techniques, such as the chemical embossing techniques. For example, in products having relatively dense foam, i.e., having relatively low content of foaming agent, and also with a product having a relatively thick foam layer, the present process is more practicable to provide a product having relatively deeper valleys than with chemical embossing techniques. High density products are preferred for certain product designs, in order to overcome the tendency of the wear layer of the product to pucker, wrinkle or blister when the product is rolled face inwardly upon a mandrel or in a shipping roll.

It should be apparent from the above that no claim is made to invention in the individual components of the products of this invention and that the base layer, foamable resin layer, color material and pattern, and transparent resin layer may be formulated in accordance with well known and previously published procedures and materials. Thus, although the base layer has been described with specific reference to an asbestos felt layer, any flexible base sheet may be employed, fibrous or non-fibrous, felted or woven, organic or inorganic, natural or synthetic. A fibrous base layer is operative containing for example fibers having a basis of wood, cotton and other vegetable or cellulose content, wood, paper, or wool although a non-fibrous base layer may be employed for some purposes such as metal foil, plastic film, etc. When fibrous, the base layer also is preferably united by means of a resin binder. A preferred base layer for example is an asbestos felt containing or impregnated with a neoprene or styrene-butadiene copolymer binder. Similarly, the base layer may carry a surface sizing or smoothing coat such as for example an ethylacrylate-styrene copolymer, an ethylacrylatemethylmethacrylate copolymer, latex, etc. In general, the base layers, base layer binders and sizing, priming or smoothing coats, foamable resin layers, blowing agents, plasticizers, stabilizers, pigments, coloring materials, and transparent resin layers disclosed in U.S. Pat. Nos. 3,293,094 and 3,458,337 are operative herein.

This invention has been disclosed with respect to certain preferred embodiments and it will be understood that modifications and variations thereof will become obvious to persons skilled in the art and are intended to be included within the spirit and purview of this application and the scope of the appended claims.

We claim:
1. A process for producing sheet material comprising a layer of cellular or foamed resin material having a mechanically embossed relief pattern in a surface thereof and being of substantially uniform composition in both the land and valley areas of the relief pattern, and a color pattern on said surface with areas of said color pattern in registry with pattern areas of the relief pattern, comprising the steps of:
   1. forming a layer of foamable resin material,
   2. heating to gel said layer of foamable resin material,
   3. applying a color pattern to the upper surface of the layer of gelled foamable resin material,
   4. applying a layer of substantially transparent resin material of substantially uniform thickness over said upper surface and color pattern,
   5. heating said layers at a sufficient temperature to foam said foamable resin material and fuse the resin material in both said layers, and
   6. drawing the sheet material containing such foamed and fused resin material while said layer of foamed resin material is hot through the nip between a backing roll contacting the undersurface of said sheet material and an embossing roll contacting the upper surface of the sheet material, said backing and embossing rolls being driven by contact with said sheet material, the embossing being effected at constant roll pressure to thereby control the pressure of engagement of the sheet material in the nip between said embossing and backing rolls, said pressure and the rotational speed of said embossing roll being controlled to apply to the surface of the layer of foamed resin material bearing the color pattern a relief pattern while maintaining the uniformity of the thickness of said layer of substantially transparent resin material, areas of which relief pattern are in registry with areas of said color pattern.

2. A process as defined in claim 1 wherein said resin material comprises polyvinyl chloride.

3. A process as defined in claim 1 wherein areas of said color pattern are in registry with land areas of said relief pattern.

4. A process as defined in claim 1 wherein areas of said color pattern are in registry with valley areas of said relief pattern.

5. A process as defined in claim 1 wherein said step 1 comprises forming said layer of foamable resin material on a felt base layer.

6. A process as defined in claim 1 wherein said step 3 comprises applying said color pattern by printing with an ink composition.

7. A process as defined in claim 1 wherein only the land areas of the relief pattern on the embossing roll are contacted with said upper surface of the sheet material.

8. A process as defined in claim 7 wherein said resin material comprises polyvinyl chloride.

9. A process as defined in claim 8 wherein said step 3 comprises applying said color pattern by printing with an ink composition.

10. A process as defined in claim 9 wherein said step 1 comprises forming said layer of foamable resin material on a felt base layer.

11. A process as defined in claim 7 wherein the surfaces of the land areas of the relief pattern on the embossing roll are textured, thereby producing an embossed sheet material in which the upper surface of the sheet material has light-reflective characteristics in valley areas of the relief pattern thereon different from those in land areas of the relief pattern.

* * * * *